United States Patent [19]

Kanemoto

[11] Patent Number: 4,568,969
[45] Date of Patent: Feb. 4, 1986

[54] NOISE ELIMINATING CIRCUIT

[75] Inventor: Yoshitaka Kanemoto, Kanagawa, Japan

[73] Assignee: Sony Corporation, Tokyo, Japan

[21] Appl. No.: 500,340

[22] Filed: Jun. 2, 1983

[30] Foreign Application Priority Data

Jun. 3, 1982 [JP] Japan .................................. 57-95197

[51] Int. Cl.$^4$ .............................................. H04N 9/64
[52] U.S. Cl. ..................................................... 358/36
[58] Field of Search .......................................... 358/36

[56] References Cited

U.S. PATENT DOCUMENTS

4,355,333 10/1982 Sato ........................................ 358/36

Primary Examiner—Michael A. Masinick
Attorney, Agent, or Firm—Lewis H. Eslinger; Alvin Sinderbrand

[57] ABSTRACT

A chroma signal is supplied to a comb-filter for eliminating noise component in the chroma signal. The output signal of the comb-filter and the input chroma signal are both supplied to a correlation circuit. The correlation circuit outputs the same signal as the output of the comb-filter when the input chroma signal and 1H delayed chroma signal have line correlation between each other. The correlation circuit further outputs the same signal as the input chroma signal at the front end portion of the chroma signal and outputs nothing at the back end portion, though the comb-filter output trails 1H delay signal at the back end portion thereof.

14 Claims, 42 Drawing Figures

FIG.4C $(=\frac{A-B}{2})$

FIG.4D $(=A \times C)$

FIG.5C $(=\frac{A-B}{2})$

UPPER HALF ; Z=X+Y
LOWER HALF ; Z=X×Y

UPPER HALF ; Z=X×Y
LOWER HALF ; Z=X+Y

FIG.10

FIG.11A (n-LINE SIG.)

FIG.11B (1H DELAYED n-LINE SIG.)

FIG.11A' (n+1-LINE SIG.)

FIG.11C $\left(=\dfrac{A-A'}{2}\right)$

FIG.12A (n-LINE SIG.)

FIG.12B (n+1-LINE SIG.)

COMB-FILTER OUTPUT C

FIG.14 fc = 3.58 MHz
fm = 7.5 KHz

FIG.15

NOISE ELIMINATING CIRCUIT

BACKGROUND OF THE INVENTION

1. Field of the Invention

The present invention relates to a noise eliminating circuit for eliminating a noise component from a color TV signal (a chroma signal, or a color difference signal such as an R-Y or B-Y signal, or the like).

2. Description of the Prior Art

Figure 1:
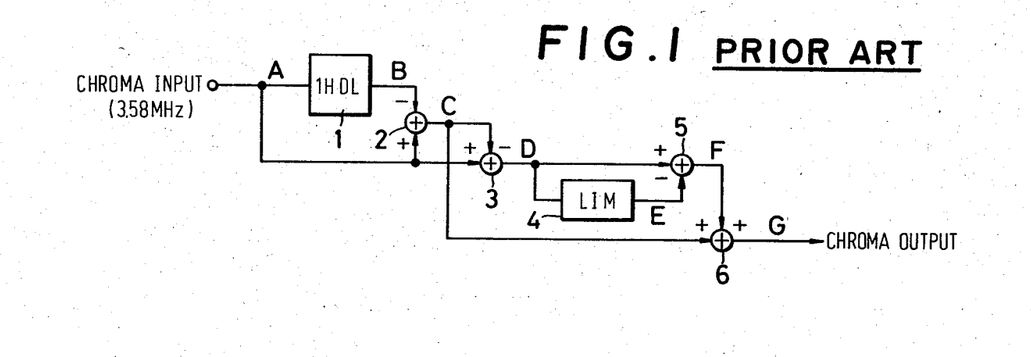
FIG. 1 is a block diagram of a conventional noise eliminating circuit using a comb-filter.
Figure 2A:
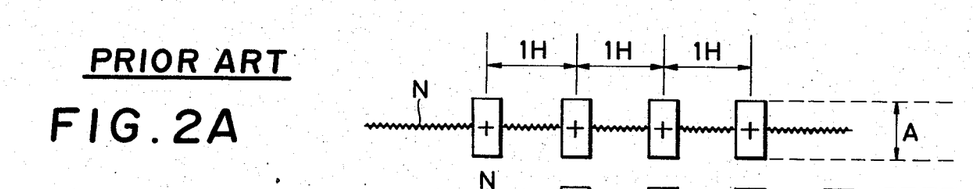
FIGS. 2A to 2G show waveforms for explaining the mode of operation of the circuit shown in FIG. 1.
Figure 2B:
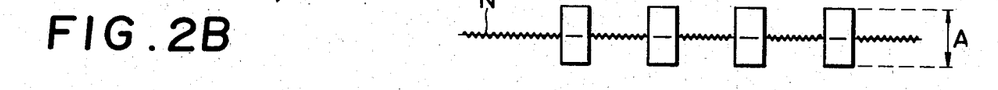

FIG. 1 is a block diagram of a conventional noise eliminating circuit of the type described above. FIG. 2 shows waveforms for explaining the mode of operation of the circuit shown in FIG. 1. Referring to FIG. 1, a 3.58 MHz input chroma signal (FIG. 2A) is delayed as shown in FIG. 2B by a 1-H delay line 1 (H:horizontal scanning period) constituting, together with a subtractor 2, a comb-filter. Since the color subcarrier of the NTSC system have the opposite phases for each successive line, the chroma components of the input to and output from the 1-H delay line 1 have the opposite phases and are line correlated. The output from the 1-H delay line 1 is subtracted from the input chroma signal by the subtractor 2 to reduce its output level to ½ the original level. Then, a chroma signal having a line correlation as shown in FIG. 2C is obtained, and a noise or distortion component (N) which is not line correlated is cancelled out.

Figure 2C:
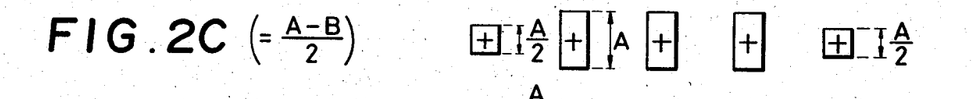

The level of the front end portion of the chroma signal as an output signal from the comb-filter comprising the 1-H delay line 1 and the subtractor 2 thus becomes A/2 as shown in FIG. 2C. Furthermore, a chroma component having a level of A/2, which component is not included in the original input signal, appears at the back end portion of the chroma signal. For this reason, color smear in the vertical direction of the screen is caused, and the color level changes at the edge of the image.

Figure 2D:
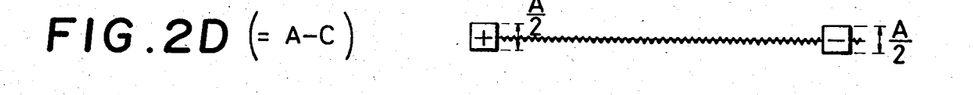
Figure 2E:
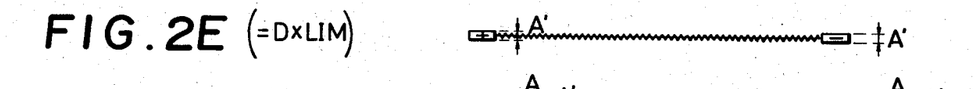
Figure 2F:
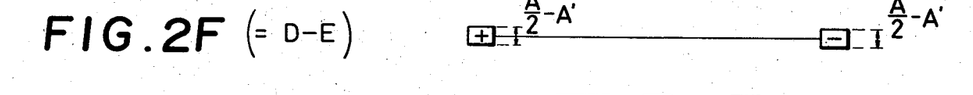

In order to reduce this undesirable effect, the following signal processing is performed. The input chroma signal is subtracted by a subtractor 3 from an output (FIG. 2C) from the comb-filter so as to extract a signal component having no line correlation (front and back end portions of the chroma signal) as shown in FIG. 2D, and to extract a noise or distortion component having no line correlation. The extracted signal is supplied to a noise cancellation circuit comprising a limiter 4 and a subtractor 5. In the noise cancellation circuit, the limiter 4 limits the amplitude of the signal component alone so as to amplitude-separate the signal components and the noise or distortion component as shown in FIG. 2E. The subtractor 5 subtracts an output signal E from the limiter 4 from an output signal D from the subtractor 3. Thus, as shown in FIG. 2F, a noncorrelated chroma signal having no noise or distortion component is extracted.

Figure 2G:
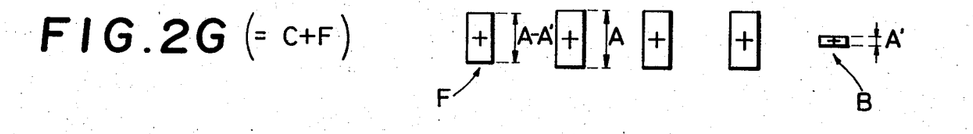

The noncorrelated chroma signal which is extracted by the noise cancellation circuit is added to an output (FIG. 2C) from the comb-filter by an adder 6, thereby performing signal level correction at the front and back end portions of the chroma signal as shown in FIG. 2G. The S/N ratio of the corrected chroma signal is improved by about 3 dB with respect to the input chroma signal, and the signal distortion (change in level) at a front end portion F and a back end portion B is reduced in comparison with a case wherein a comb-filter alone is used.

However, as shown in FIG. 2G, the problems of reduction in the color level at the front end portion F of the signal and color smear at the back end portion B remain. In order to eliminate these problems, the limiting level of the limiter 4 of the noise cancellation circuit shown in FIG. 1 must be increased (that is, the limiting function must be enhanced with respect to the chroma signal). Conversely, in order to reduce the residual noise level and distortion component, the limiting level must be decreased (that is, the limiting function must be weakened).

SUMMARY OF THE INVENTION

It is an object of the present invention to provide a noise eliminating circuit which is capable of eliminating color level reduction or color smearing at the front or back end portion of an input chroma signal to a visually negligible degree, and which is also capable of improving the S/N ratio at a signal portion having a line correlation over a case wherein only a simple comb-filter is used.

DETAILED DESCRIPTION OF THE PREFERRED EMBODIMENTS

The principle and embodiments of the present invention will now be described with reference to the accompanying drawings.

Figure 3:
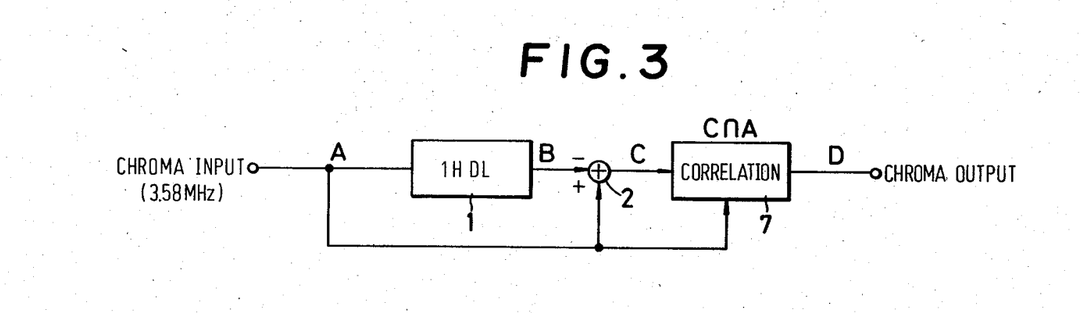
FIG. 3 is a block diagram for explaining the principle of operation of a noise eliminating circuit according to the present invention.

FIG. 3 is a block diagram showing the principle of operation of a noise eliminating circuit according to the present invention, and FIGS. 4A to 4D and FIGS. 5A to 5D' show waveforms for explaining the mode of operation of the circuit shown in FIG. 3.

Figure 4A:
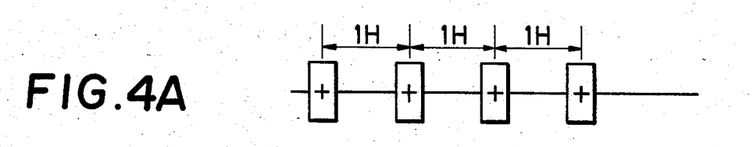
FIGS. 4A to 4D show waveforms for explaining the mode of operation of the circuit shown in FIG. 3.
Figure 4B:
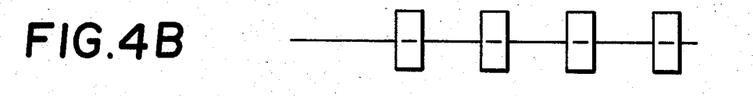
Figure 4C:
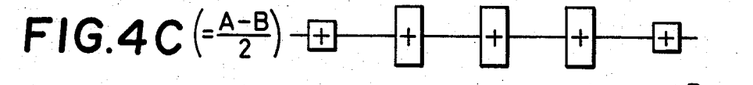
Figure 4D:
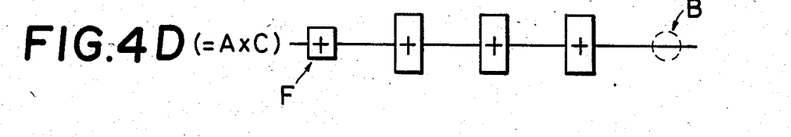
Figure 5A:
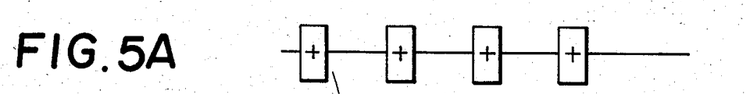
FIGS. 5A to 5D' show waveforms corresponding to FIG. 4 for explaining an improved principle of operation according to the present invention.
Figure 5B:
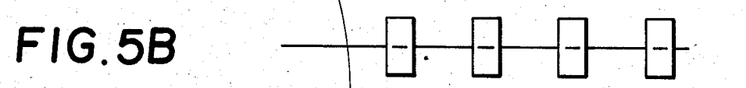
Figure 5C:
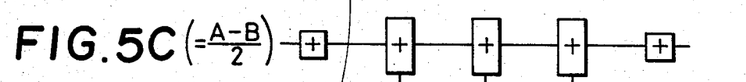
Figure 5D:
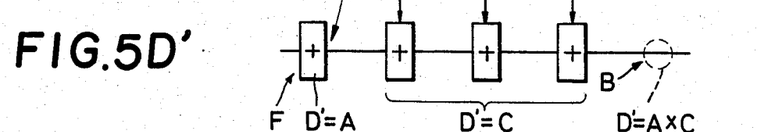

Referring to FIG. 3, an input chroma signal A (FIG. 4A) is supplied to a comb-filter consisting of a 1H-delay line 1 and a subtractor 2, as in the case of FIG. 1. Then, a chroma signal C with an improved S/N ratio as shown in FIG. 4C is obtained. The obtained chroma signal C is then supplied to a correlator 7 which correlates the chroma signal C from the subtractor 2 with the original input chroma signal A. The correlator 7 has a logic AND function and produces an output signal $D = A \times C$, shown in FIG. 4D. Therefore, since no signal component which is not included in the input chroma signal A may be produced from the output of the correlator 7, no undesired signal may appear at the back end portion B of the chroma signal, as shown in FIG. 4D. As a result, color smear in the vertical direction of the screen may be eliminated.

According to an embodiment of the present invention, the principle of the present invention as shown in FIG. 3 is improved upon, and the correlator 7 is constructed so that the reduction in color level at the front end portion F of the chroma signal shown in FIG. 4D may be corrected. More specifically, as may be seen from the waveform chart shown in FIG. 5D', an input chroma signal (FIG. 5A) which is not included in the output (FIG. 5B) from the 1H-delay line 1 is directly produced as an output D' (FIG. 5D') from the correlator 7 ($D' = A$) at the front end portion F of the signal. An input chroma signal which is line correlated with both the signals A and B is obtained as the intermediate output from the comb-filter ($D' = C$). At the back end portion B of the signal, a signal component which is not included in the input chroma signal A but which is included in the delayed output signal B is not produced in the output signal ($D' = A \times C$). As a result, a signal which is substantially the same as the input chroma signal and which has an improved S/N ratio is obtained.

Figure 6:
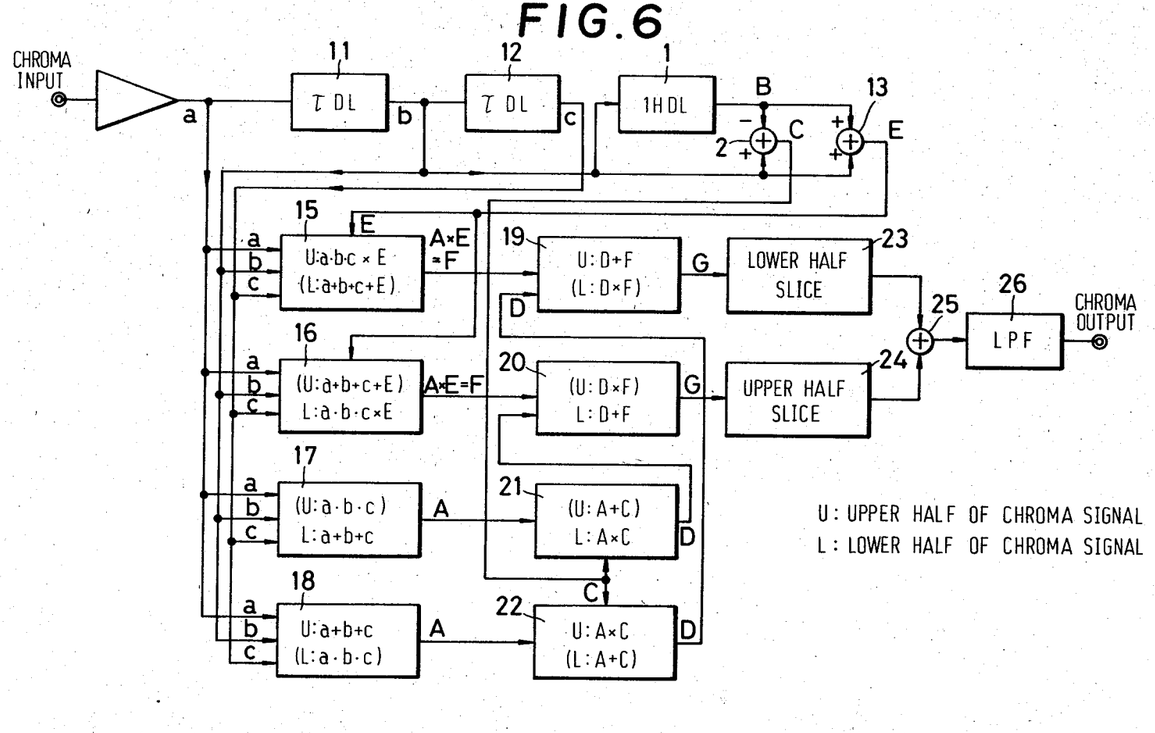
FIG. 6 is a block diagram of a noise eliminating circuit according to an embodiment of the present invention.

FIG. 6 is a block diagram of a noise eliminating circuit according to an embodiment of the present invention, and FIGS. 7A to 7G show waveforms for explaining the mode of operation of the same.

Referring to FIGS. 7A to 7G, a 1H-delayed signal (FIG. 7B) is subtracted from an input chroma signal (FIG. 7A) in a similar manner to that described in FIG. 5, and a comb-filter output C is obtained. At this time, a noise component or distortion component (indicated by small circular marks in FIG. 7) having no line correlation and which was included in the input chroma signal is attenuated. If the input chroma signal is a reproduction output from a VTR, it has been distorted in one direction along the axis of amplitude by the non-linear portion of an electric-magnetic conversion system of a magnetic tape/magnetic head. When a chroma signal is recorded by inversion for each successive 1 H period, the distortion component appears to have opposite phases for each successive line. Therefore, the distortion component of the signal processed by a comb-filter is cancelled out by averaging.

Figure 7A:
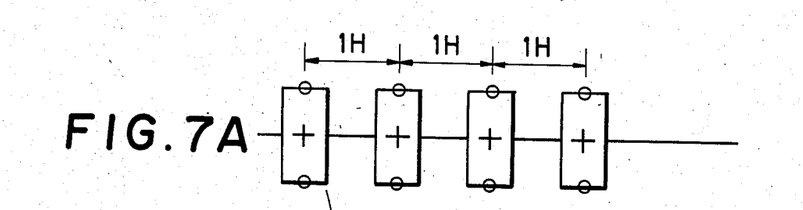
FIGS. 7A to 7G show waveforms for explaining the mode of operation of the circuit shown in FIG. 6.
Figure 7B:
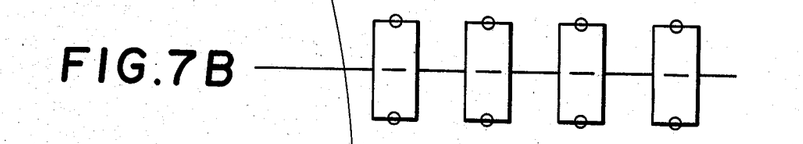
Figure 7C:
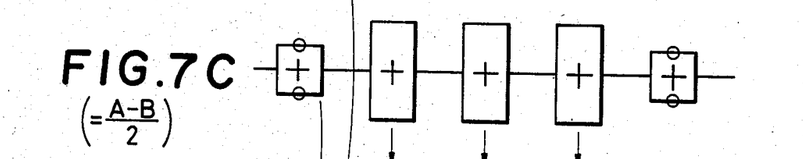
Figure 7D:
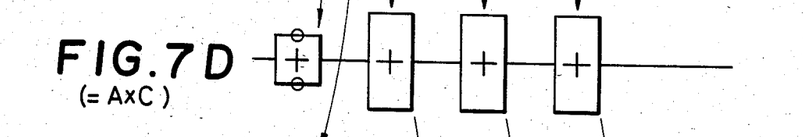

Subsequently, the input chroma signal A and the comb-filter output C are logic ANDed ($A \times C$), and a signal D as shown in FIG. 7D is obtained which may not cause color smear at the back end portion B of the chroma signal. If the amplitude of the input chroma signal A is greater than that of the output C, the output from the comb-filter is produced as the output corresponding to all the portions of the input chroma signal excluding its back end portion. At the front end portion, an input chroma signal having a level of $\frac{1}{2}(-6 \, dB)$ the original level and a distortion component attenuated to a $\frac{1}{2}$ its original level is obtained.

Figure 7E:
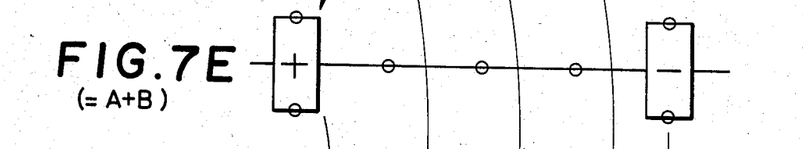

Then, the signals A and B are ORed ($A + B$) so as to provide a signal E having no line correlation and a distortion or noise component having no line correlation, as shown in FIG. 7E. Then, the signals E and A are ANDed ($A \times E$) to provide a signal F as the initial line signal of the input chroma signal and a noise or distortion component having no line correlation. The signal which causes color smear at the back end portion of the input chroma signal A is eliminated.

Figure 7F:
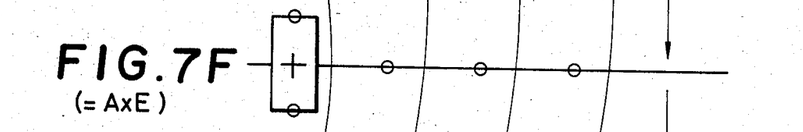
Figure 7G:
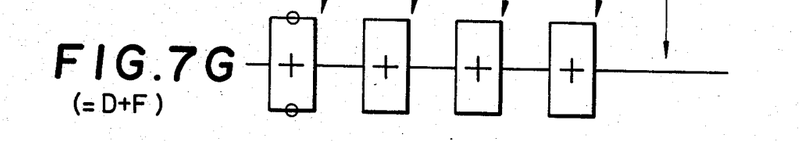

As the final processing step, the signals D and F are ORed ($D + F$) to perform level correction at the front end portion and to provide an output signal G shown in FIG. 7G. When the output signal G and the input signal A are compared with each other, the input signal is directly output for the initial line of the input chroma signal, an output signal with the noise eliminated by a comb-filter is output at the intermediate portion of the input chroma signal, and no extra signal is produced for the next line after the end of the input chroma signal. Accordingly, the problems encountered with the noise eliminating circuit shown in FIG. 1, that is, a reduction in color level at the front end portion in the vertical direction of an image, and color smear at the back end portion, are eliminated.

The embodiment of the present invention will now be described with reference to the block diagram shown in FIG. 6. Symbols A to G in FIG. 6 correspond to the waveforms shown in FIGS. 7A to 7G. Referring to FIG. 6, an input chroma signal is supplied to a series circuit of $\tau$-delay lines 11 and 12 through an amplifier 10. It should be noted that $\tau$ denotes a small delay time, and an input signal a and output signals b and c from the respective $\tau$-delay lines 11 and 12 are used for eliminating the phase distortion to be described later. The output signal b from the delay line 11 is used as a main line signal and is processed by a comb-filter consisting of a 1-H delay line 1, a subtractor 2 and an adder 13. Output signals C and E from the subtractor 2 and the adder 13 of the comb-filter, respectively, and the input signals a to c, are processed by correlators 15 to 22, and logic operations (AND and OR) as described with reference to FIG. 7 are performed. Since each correlator processes only either of the upper and lower halves (positive and negative cycles) of the waveform of an input chroma signal, two series of correlators for processing respective halves of the input waveform are incorporated.

Figures 8A, 8B:
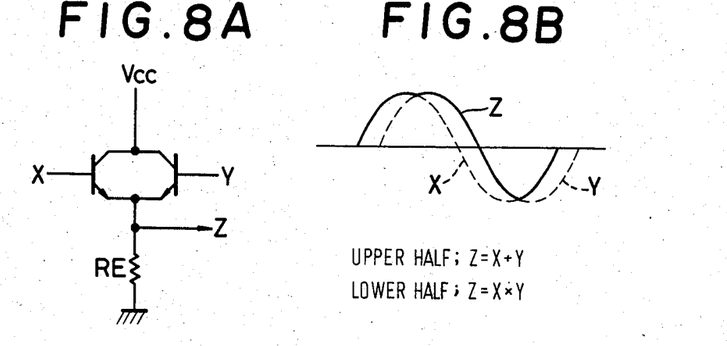
FIGS. 8A and 9A are, respectively, circuit diagrams showing the basic configurations of the correlators shown in FIG. 6.
FIGS. 8B and 9B show waveforms for explaining the mode of operation of the circuits shown in FIGS. 8A and 9A, respectively.
Figures 9A, 9B:
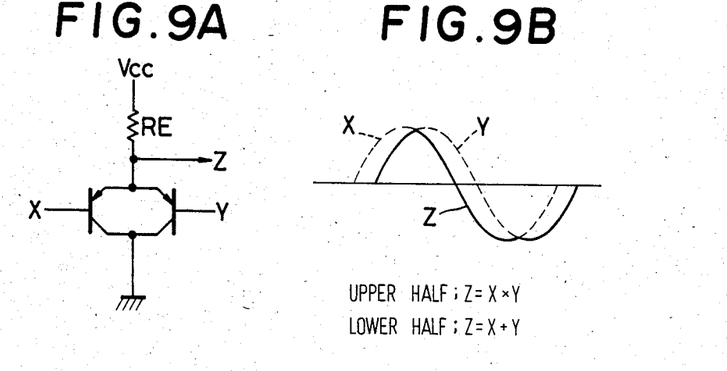

FIGS. 8A and 9A show the basic circuit configuration of the respective correlators 15 to 22, and FIGS. 8B and 9B show the corresponding operation waveforms. In the correlator shown in FIGS. 8A or 9A, which are reffered as NAM (non-additive mixing) circuit, the emitters or collectors of a pair of npn or pnp transistors are commonly connected, and an AND or OR product z of inputs X and Y is obtained from a common emitter resistor RE. When the correlator comprises npn transistors as in FIG. 8A, whichever portion of the inputs X and Y has the higher level becomes the output level. Accordingly, the output signal Z of the logic OR product X+Y is obtained for the upper half of the waveform as shown in FIG. 8B, while the output signal Z of the logic AND product X×Y is obtained for the lower half thereof. On the other hand, when the correlator comprises pnp transistors as in FIG. 9A, since whichever portion of the input signals X and Y has the lower level becomes the output level. Thus, the output signal Z of the logic AND product X×Y is obtained for the upper half of the waveform while the output signal Z of the logic OR product X+Y is obtained for the lower half thereof.

Each of the correlators 15 to 22 shown in FIG. 6 comprises the basic circuit as shown in FIG. 8A or 9A. Referring to FIG. 6, the input signal a and the output signals b and c from the series circuit of the τ-delay lines 11 and 12 are supplied to the correlators 17 and 18 which form logic OR products a+b+c for the respective lower and upper halves of the signal. Although this processing is a preprocessing step for eliminating the phase distortion, the logic OR product a+b+c or the logic AND product a·b·c is handled as substantially equal to the input chroma signal as shown in FIG. 7A. The output signals A from the correlators 17 and 18 are respectively supplied to the correlators 21 and 22, which logic AND these input signals with the comb-filter output signal C (FIG. 7C) from the subtractor 2. Thus, the correlators 21 and 22 produce output signals D=A×C (FIG. 7D).

Meanwhile, the output signal (FIG. 7B) from the 1H-delay line 1 of the comb-filter and the main line signal b (=A) are added by the adder 13, and a signal E as shown in FIG. 7E is obtained. The signal E and the signals a, b and c are supplied to the correlators 15 and 16. For the upper and lower halves of the signal, the correlators 15 and 16 perform the logic AND operation of (a b c)×E or (A×E), and a signal F as shown in FIG. 7F is obtained. The signal F and the output signals D from the correlators 21 and 22 are supplied to the correlators 19 and 20. For the upper and lower halves of the signal, the correlators 19 and 20 perform the logic OR operation D+F, and a signal G as shown in FIG. 7G is obtained.

The signals obtained by the above processing are added together by an adder 25 through lower and upper slicing circuits 23 and 24. The output signal from the adder 25 is supplied to a low-pass filter 26 in order to eliminate the harmonic components.

Elimination of the phase distortion will now be described. In general, a chroma signal reproduced by a VTR has an amplitude distortion of ±ΔE and a phase distortion of ±Δθ as may be seen from the waveform shown in FIG. 10. These distortions do not have line correlation. Taking the phase distortion as an example, a chroma signal A for the n-th line (n-line signal) shown in FIG. 11A and a signal A' for the (n+1)th line ((n+1)-line signal) shown in FIG. 11A' have opposite phase distortions +Δθ and −Δθ with reference to zero phase. In the comb-filter shown in FIG. 6, a comb-filter output signal C as shown in FIG. 11C is obtained which is the arithmetic mean of signals of adjacent lines (nth and (n+1)th lines); that is, a correlation is obtained between the 1H-delayed signal shown in FIG. 11B and the (n+1)-line shown in FIG. 11A', with which correlation the phase distortion is cancelled out (averaged).

Figure 12A:
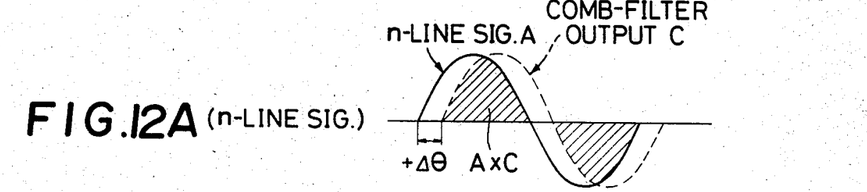
FIGS. 12A and 12B show waveforms showing the state wherein the phase distortion is left by the AND operation of the correlator.
Figure 12B:
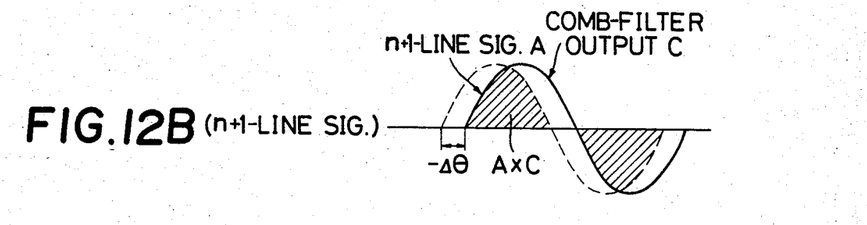

When the input signal A and the comb-filter output signal C are ANDed by the correlators 21 and 22 shown in FIG. 6, a logic output signal A×C is obtained for the comb-filter output signal C (dotted line) in which the phase distortion is averaged out, as shown in FIG. 12A. For the nth line, the right portion of the signal is eliminated due to the distortion +Δθ+# of the input signal A. On the other hand, as shown in FIG. 12B, for the (n+1)th line, the left portion of the signal is eliminated due to the distortion −Δθ of the signal. In other words, at the intermediate portion of the signal as shown in FIG. 7G, the comb-filter output signal C may not be directly produced, but has the phase distortion of the input signal A also mixed in.

Figure 13A:
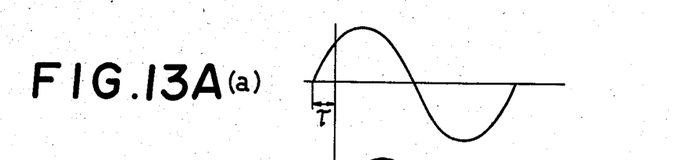
FIGS. 13A to 13D show waveforms for explaining the AND operation performed by the correlators shown in FIG. 6.
Figures 13B, 13C, 13D:
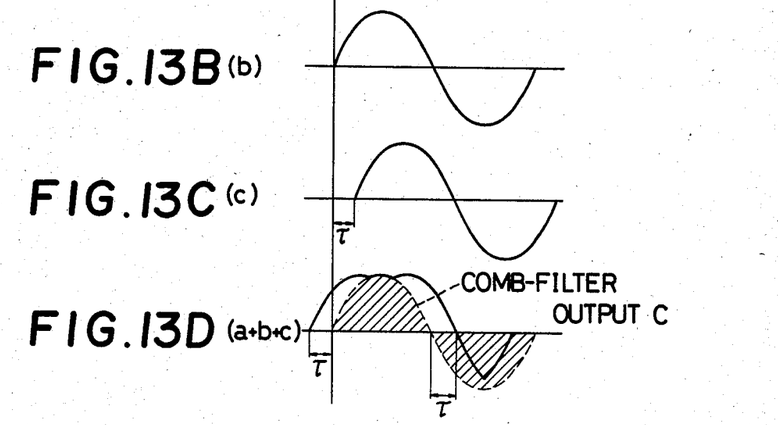

In view of this problem, as shown in FIG. 6, the signals b and c which are slightly delayed from the input signal a are obtained by the delay lines 11 and 12. The correlators 17 and 18 obtain the logic OR product a+b+c, which is the signal A. The signal A and the comb-filter output signal C are ANDed by the correlators 21 and 22. If τ>+#Δθ, the operation result becomes the comb-filter output signal C itself as indicated by the hatched lines in FIG. 13.

Figure 10:
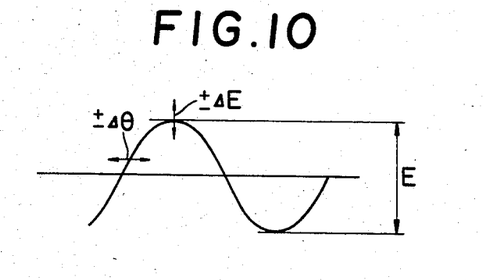
FIG. 10 shows a signal waveform for explaining distortion of the input chroma signal.
Figure 11A:
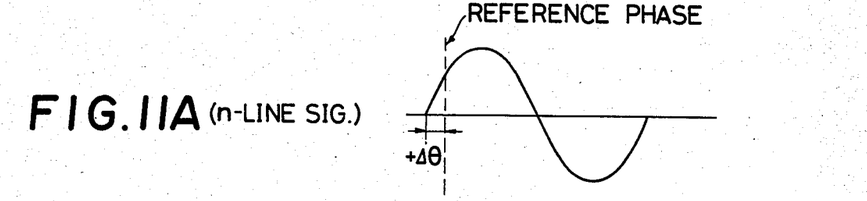
FIGS. 11A to 11C show waveforms for explaining the phase distortion elimination effect obtained by a comb-filter.
Figure 11B:
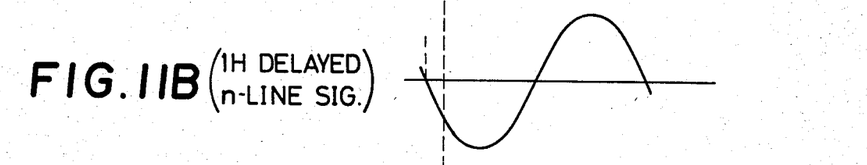
Figure 11C:
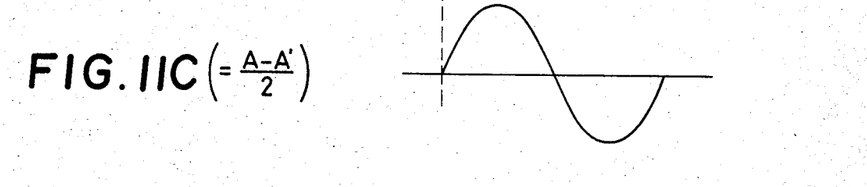

The amplitude distortion ±ΔE shown in FIG. 10, is also averaged and cancelled out in the output signal E (FIG. 7E) from the adder 13 of the comb-filter shown in FIG. 6. Therefore, if the logic AND product a·b·c is used as the signal A in the AND operation of A×E by the correlators 15 and 16 and if the minimum amplitude of the AND product a·b·c is set to be greater than that of the signal E, the filter output E having no amplitude distortion may be obtained as a logic AND output signal F.

Figure 14:
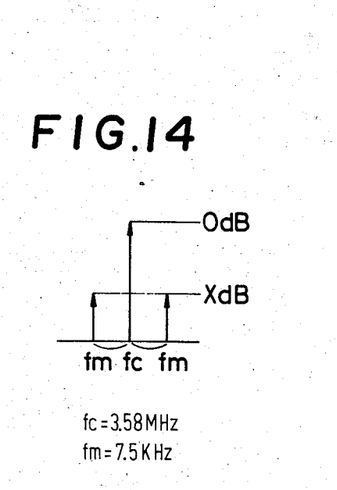
FIG. 14 is a graph showing the frequency spectrum of an input chroma signal which was used for measuring the characteristics of the noise eliminating circuit shown in FIG. 6.

The performance of the noise eliminating circuit as shown in FIG. 6 will now be described with reference to actual measurements. An input chroma signal was a signal obtained by AM modulation or PM modulation of a 3.58 MHz subcarrier ($f_c$) with a noise component of (X dB) at fm=7.5 kMz, as may be seen from the spectrum shown in FIG. 14. The ratio of the amplitudes of the input chroma signal and the comb-filter output signal (i.e., the margin for the amplitude distortion ±ΔE) was set to be 5:1, and the delay time τ of the delay lines 11 and 12 (i.e., the margin for the phase distortion ±Δθ) was set to be 29ns (3.6°). The output distortion levels (AM and PM) as shown in the table below were measured for the noise or distortion level X (dB) of the input signal.

TABLE

| Input distortion X (dB) | Output distortion level | | | |
|---|---|---|---|---|
| | AM (dB) | Improvement (dB) | PM (dB) | Improvement (dB) |
| −10 | −16 | 6 | −23 | 13 |
| −12 | | | −33 | 21 |
| −14 | −30 | 16 | −40 | 26 |
| −15 | −40 | 25 | −52 | 27 |
| −16 | −50 | 34 | | |

As may be seen from the above table, a great improvement in the S/N ratio for the amplitude and phase distortions is obtained. Since the margins for ±ΔE and ±Δθ are set in the correlators for eliminating the distortion, the improvement has a predetermined threshold. Thus, if the input distortion is greater than the set margin, the effect of distortion elimination is degraded.

Figure 15:
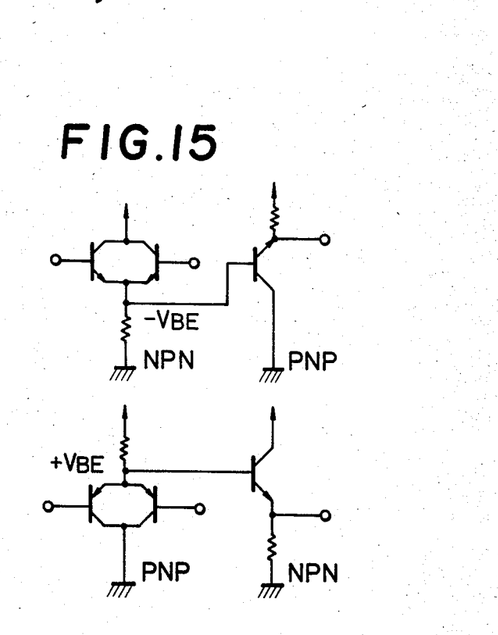
FIG. 15 is a circuit diagram for explaining a method for compensating for the temperature of the correlators shown in FIG. 6.

Finally, the configuration of the correlators shown in FIG. 6 will be described. Since the upper and lower halves of the signals supplied to the correlators 15 to 22 are nonsymmetrical in an AC manner, all of them must be DC coupled. For this purpose, when a correlator comprises an npn transistor as shown in FIG. 15, a buffer pnp transistor must be arranged at the output so as to perform temperature compensation of its base-emitter voltage $V_{BE}$. When a correlator comprises a pnp transistor, a buffer npn transistor must be incorporated.

When coupling correlators, a level shifter is required so as to absorb the variations in the base-emitter voltage $V_{BE}$. Furthermore, in order to reduce the adverse effect of the variations in the base-emitter voltage $V_{BE}$, the level of an input signal to be processed must be maximized. If the input signal level remains high, even at a non-linear portion due to the switching operation of the transistor, the non-linear distortion (leading or trailing edge of the signal) in the output signals from the slicing circuits 23 and 24 may be kept negligible with respect to the entire amplitude of the output signal. Accordingly, the configuration of the correlators may be simplified without requiring a complex feedback circuit.

In summary, according to the present invention, reduction in the color level at the front end portion in the vertical direction of an image and color smear at the back end portion thereof, which are ordinarily caused by the processing required for eliminating the noise or distortion components with a comb-filter, may be eliminated, so that a high-quality image may be obtained.

What is claimed is:

1. A chroma noise eliminating circuit, comprising:
 a source of an input chroma signal;
 first delay means for delaying said input chroma signal by a delay time predetermined in accordance with a phase distortion in said input chroma signal to provide a first delayed signal;
 second delay means for delaying said first delayed signal by a horizontal interval (1H) to provide a second delayed signal;
 adder means for adding said first delayed signal and said second delayed signal to provide an added output;
 subtracter means for subtracting said second delayed signal from said first delayed signal to provide a subtracted output;
 first non-additive mixing means for non-additively mixing said input chroma signal, said first delayed signal and said added output of said adder means to provide an output with reduced phase distortion;
 second non-additive mixing means for non-additively mixing said input chroma signal and said first delayed signal to provide an output with reduced phase distortion;
 third non-additive mixing means for non-additively mixing said subtracted output of said subtracter means and said output of said second non-additive mixing means to provide an output;
 fourth non-additive mixing means for non-additively mixing said output of said first non-additive mixing means and said output of said third non-additive mixing means to provide an output; and
 extractor means for extracting a signal of predetermined polarity from said output of said fourth non-additive mixing means.

2. A circuit according to claim 1, in which said predetermined delay time is less than 1H.

3. A circuit according to claim 2, in which said first, second, third and fourth non-additive mixing means each includes first and second non-additive mixing circuits for mixing positive and negative portions, respectively, of signals input thereto.

4. A circuit according to claim 3, in which each of said first and second non-additive mixing circuits includes a plurality of series connected non-additive mixers.

5. A circuit according to claim 4, in which each of said series connected non-additive mixers of each said first non-additive mixing circuit includes an associated pair of PNP transistors and a first resistor, said PNP transistors of each pair having respective collectors connected to each other and respective emitters also connected to each other and to said first resistor at a first connection point to provide an output signal thereat, and in which each of said non-additive mixers of each said second non-additive mixing circuit includes an associated pair of NPN transistors and a second resistor, said NPN transistors of each pair having respective collectors connected to each other and respective emitters also connected to each other and to said second resistor at a second connection point to provide an output signal thereat.

6. A circuit according to claim 5, in which said extractor means includes first and second selector means and second adder means, said first selector means selecting only a positive polarity signal in comparison with a predetermined biasing potential and said second selector means selecting only a negative polarity signal in comparison with said biasing potential, output signals of said selector means being supplied to said second adder to provide a combined output chroma signal, and in which said second non-additive mixing circuit of said fourth non-additive mixing means is connected to said first selector means, and said first non-additive mixing circuit of said fourth non-additive mixing means is connected to said second selector means.

7. A circuit according to claim 2, in which said extractor means includes first and second selector means and second adder means, said first selector means selecting only a positive polarity signal in comparison with a predetermined biasing potential and said second selector means selecting only a negative polarity signal in comparison with said biasing potential, output signals of said selector means being supplied to said second adder to provide a combined output chroma signal.

8. A circuit according to claim 1, further comprising third delay means for delaying said first delayed signal by said predetermined delay time to provide a third delayed signal;
 said first non-additive mixing means additionally receiving said third delayed signal and being responsive to the signals input thereto to provide its respective output without phase distortion; and
 said second non-additive mixing means additionally receiving said third delayed signal and being responsive to the signals input thereto to provide its respective output without phase distortion.

9. A circuit according to claim 8, in which said predetermined delayed time is less than 1H.

10. A circuit according to claim 9, in which said first, second, third and fourth non-additive mixing means each includes first and second non-additive mixing circuits for mixing positive and negative portions, respectively, of signals input thereto.

11. A circuit according to claim 10, in which each of said first and second non-additive mixing circuits includes a plurality of series connected non-additive mixers.

12. A circuit according to claim 11, in which each of said series connected non-additive mixers of each said first non-additive mixing circuit includes an associated pair of PNP transistors and a first resistor, said PNP transistors of each pair having respective collectors connected to each other and respective emitters also connected to each other and to said first resistor at a first connection point to provide an output thereat, and in which each of said series connected non-additive mixers of each said second non-additive mixing circuit includes an associated pair of NPN transistors and a second resistor, said NPN transistors of each said pair having respective collectors connected to each other and respective emitters also connected to each other and to said second resistor at a second connection point to provide an output signal thereat.

13. A circuit according to claim 12, in which said extractor means includes first and second selector means and second adder means, said first selector means selecting only a positive polarity signal in comparison with a predetermined biasing potential and said second selector means selecting only a negative polarity signal in comparison with said biasing potential, output signals of said pair of selector means being supplied to said second adder to provide a combined output chroma signal.

14. A circuit according to claim 13, in which said second non-additive mixing circuit of said fourth non-additive mixing means is connected to said first selector means, and said first non-additive mixing circuit of said fourth non-additive mixing means is connected to said second selector means.

* * * * *